ADAPTIVE FILTER

Filed Nov. 19, 1968 2 Sheets-Sheet 1

INVENTORS
JEROME M. IDELSOHN
RALPH W. ROTHFUSZ
BY Harry A. Herbert Jr.
George Fine and
ATTORNEYS

ADAPTIVE FILTER

Filed Nov. 19, 1968 2 Sheets-Sheet 2

INVENTORS
JEROME M. IDELSOHN
RALPH W. ROTHFUSZ
BY Harry A. Herbert Jr and
George Fine
ATTORNEYS United States Patent Office 3,537,024
Patented Oct. 27, 1970

3,537,024
ADAPTIVE FILTER

Jerome M. Idelsohn, Huntington Woods, and Ralph W. Rothfusz, Southfield, Mich., assignors to the United States of America as represented by the Secretary of the Air Force Filed Nov. 19, 1968, Ser. No. 776,882
Int. Cl. H03f 1/36, 3/68
U.S. Cl. 330—30 5 Claims

ABSTRACT OF THE DISCLOSURE

An adaptive filter apparatus providing variable input and negative feedback networks to be used with an operational amplifier. The input and feedback networks are composed of frequency sensitive components, and are arranged to provide variable lead, lag, or bandpass filtering of an input signal.

BACKGROUND OF THE INVENTION

The present invention relates broadly to a system for controlling the input and feedback networks of an operational amplifier and, more particularly, to an adaptive filter for digitally controlling the lead, lag, and bandpass functions of an operational amplifier.

In prior art of adaptive filter apparatus, it was often required that an input signal be compared with stored information which is derived from input signals which are fed into the system over a period of time. In order for such an adaptive filter apparatus to function, it is necessary that the signal to be recognized is established in storage from received signals and adjusted in accordance with a weighted average of the input signals depending upon both the number of times a given signal occurs and the time that elapses between occurrences of such a signal. Thus, it may be noted that the speed of operation and speed of response of the prior art adaptive filters are dependent upon the sampling interval and the frequency of the incoming signal. In many applications, it is necessary that the adaptive filter be totally independent of the incoming signal and that the adaptive filter react virtually simultaneously to the incoming signal. The present invention provides an adaptive filter which may be automatically and simultaneously controlled with respect to the incoming signal.

SUMMARY OF THE INVENTION

The present invention utilizes digital-to-analog converters in both the input and feedback paths of an operational amplifier. By adjustably controlling the impedance level being used in the operational amplifier's input and feedback networks, the adaptive filter may be conditioned to perform the variable lead, variable lag or variable bandpass functions. The variable lead, lag, and bandpass functions are provided by controlling the digital inputs to the digital-to-analog converters. This technique provides significant advantages in circuit simplicity, flexibility, transient response, and signal-to-noise ratio.

It is one object of the invention, therefore, to provide an improve adaptive filter apparatus being responsive to the incoming signal.

It is another object to provide an improved adaptive filter apparatus having controllable lead, lag and bandpass functions.

It is another object to provide an improved adaptive filter apparatus being responsive to digital control signals.

It is yet another object to provide an adaptive filter apparatus having a substantially higher speed of response and independence from incoming signal which is economical to produce and utilizes conventional currently available materials that lend themselves to standard mass production manufacturing techniques.

These and other advantages, objects and features of the invention will become more apparent from the following detailed description when taken in conjunction with the illustrative embodiments in the accompanying drawings.

DESCRIPTION OF THE PREFERRED EMBODIMENTS

Figure 1:
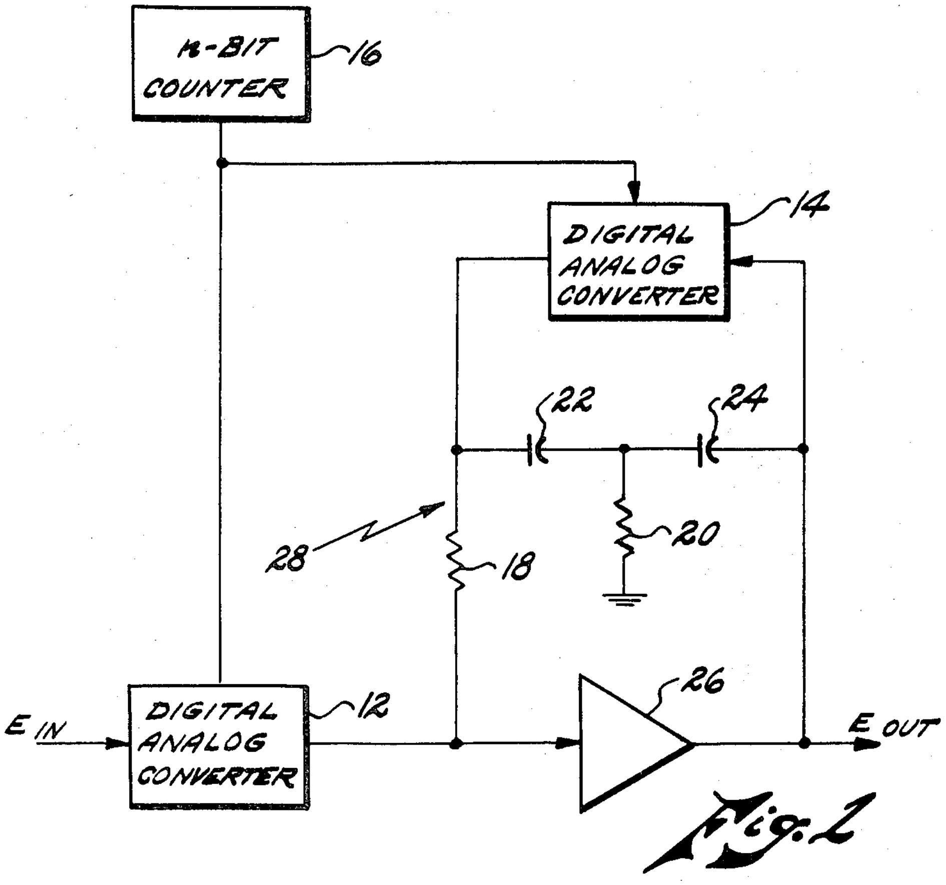
FIG. 1 is a block diagram, partly schematic, of the adaptive bandpass filter in accordance with this invention.

Referring now to FIG. 1, the adaptive bandpass filter apparatus utilizes an operational amplifier with variable input and feedback networks. The variable feature is implemented with digital to analog (D/A) converters which act as adjustable voltage attenuators and may be referred to as a digitally controlled variable resistance means. The conventional D/A converters 12, 14 are driven by a conventional n-bit counter 16. The counter content is a variable quantity X, which is a number which may range from 1 to $2^n-1$. The operation of the individual converters is such that an input analog voltage is attenuated by the factor $X/2^n$, and is then applied to a conventional internal series resistor to provide output. The converters 12, 14 may, therefore, be viewed as a digitally controlled voltage attenuator in series with a constant resistance.

The present invention may be used with two D/A converters, in conbination with an operational amplifier having a bridge-T network in its feedback path to provide an adaptive bandpass configuration. The bridge-T filter configuration is a well-known network generally containing two resistors and two capacitors and having the transfer function $$\frac{E_{out}}{E_{in}}=\frac{T_1T_2s^2+T_1s+1}{T_1T_2s^2+(2T_1+T_2)s+1}$$

where $T_1=R_1C$ and $T_2=R_2C$

The elements $R_1$, $R_2$ and C of the above equation may be related to specific components in FIG. 1. In the figure, $R_1$ is resistor 20, $R_2$ is the output (hereinbefore mentioned internal) resistance of D/A converter 12, and C is the value of either capacitor 22 or 24. Capacitors 22, 24 are of equal value. The frequency characteristics of this network are such that it acts as a bandstop filter. Thus, when the network is at its resonant frequency, $\omega_o$, the attenuation through the network is a maximum. As frequency deviates to either side of $\omega_o$, the gain increases, and eventually approaches unity. The exact frequency response for this network depends upon the choice of the network time-constants, $T_1$ and $T_2$. The basis of the discussion of the preferred embodiment will be an adaptive bandpass filter which may be implemented by having a bridge T network in the feedback path of an operational amplifier.

Referring once again to FIG. 1, the present invention utilizes the standard high-gain operation amplifier configuration 26 which is modified to include a bridge-T network 28 in the feedback path. The bridge-T (feedback) network 28 is comprised of resistors 18, 20, capacitors 22, 24 and the output (hereinbefore mentioned internal) resistance (not shown) of D/A converter 14. Thus, by varying the value of the output resistance in D/A converter 14, the frequency response of the bridge-T (feedback) network 28 may be varied over a wide range of resonant frequencies. The n-bit counter 16 provides the digital control signals to D/A converters 12 and 14, which respectively provide the impedance levels for the input and feedback networks of the operational amplifier. The output (hereinbefore mentioned internal) resistance of D/A converter 12 is the input resistance to amplifier 26 and its value varies directly with the digital control signal from n-bit counter 16. The variable resistance in feedback network 28 is the output resistance of D/A converter 14 and its value varies directly with the digital control signal from n-bit counter 16. Since the bridge-T (feedback) network 28 is located in the negative feedback path of the amplifier 26, it is apparent that if the attenuation through the network is a maximum, then the gain through the amplifier is also a maximum. The overall closed-loop circuit, therefore, acts as a bandpass or notch filter, with the center frequency of the passband equal to $\omega_0$, the resonant frequency of the bridge-T (feedback) network.

The circuit may be further analyzed by substituting equivalent circuits for the D/A converters 12, 14. If the effect of loading on the bridge T is also considered, then analysis yields the following expressions for $E_{out}/E_{in}$ and $\omega_0^2$, where $$\frac{E_{out.}}{E_{in.}}=\left[\frac{.5T_1T_2s^2+(2T_1+.5T_2)s+1}{\frac{2^n}{X}T_1T_2s^2+2Ts+1}\right]$$

and $$\omega_0^2=\frac{1}{\left(\frac{2^n}{X}\right)T_1T_2\left[1+2\left(\frac{T_1}{T_2}\right)\left(2+\frac{X}{2^n}\right)\right]}$$

It may be seen that the resonant frequency, $\omega_0^2$, is a function of the D/A converter attenuation factor, $X/2^n$. If the time constants $T_1$ and $T_2$ are chosen such that $T_1 \ll T_2$, then the expression for $\omega_0^2$ may be approximately written as:

$$\omega_0^2 \simeq \left[\frac{X}{2^n}\right]\cdot\left[\frac{1}{T_1T_2}\right]$$

in which the attenuation factor appears as a direct coefficient. This is the desired frequency characteristic, and indicates that the resonant frequency of the adaptive filter may be directly controlled by changing the counter content, X. If the n-bit counter 16 is assumed to have a five-bit capacity ($n=5$), then the attenuation factor may range from $1/32$ to $31/32$, which corresponds approximately to a 2.5 octave range in $\omega_0$. In general, the range of $\omega_0$, in octaves may be approximately given by $n/2$, for $n \geq 4$.

Figure 4:
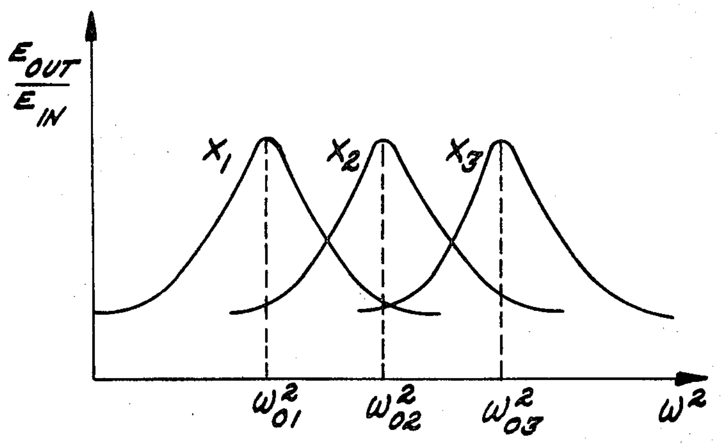
FIG. 4 is a set of output responses illustrating the operation of the adaptive bandpass filter for various input and control signals.

Typical frequency characteristics of an adaptive bandpass filter for several values of counter content, X, are illustrated in FIG. 4. It may be noted that as the different values of counter content ($X_1$, $X_2$, $X_3$) are used, a corresponding shift in resonant frequency ($\omega_0^1$, $\omega_0^2$, $\omega_0^3$) occurs. Thus, the overall frequency response of the adaptive filter apparatus varies directly with the control signal (which is the counter content, X), from the n-bit counter 16. The input signal $E_{in}$ to the adaptive filter apparatus is received by digital to analog converter 12 and the output signal $E_{out}$ is provided at the output of operational amplifier 26.

Figure 2:
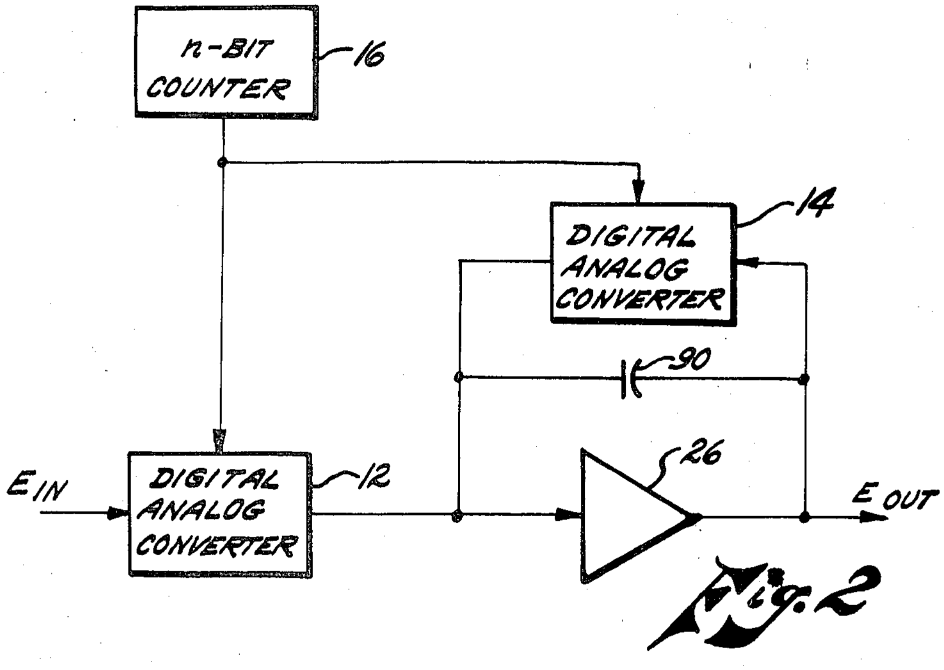
FIG. 2 is a block diagram, partly schematic, of an adaptive lag filter.

Turning now to FIG. 2, the lag configuration of the adaptive filter is shown. FIG. 2 is a modification of the adaptive bandpass filter shown in FIG. 1 wherein the bridge-T network 28 (FIG. 1) is removed and a single capacitor 90 becomes the feedback network around operational amplifier 26. The operation of the circuit is basically the same as in FIG. 1 except that capacitor 90 now cooperates with the internal output resistance (not shown) of D/A converter 14 to provide a first-order lag function. Since the first-order lag function is dependent upon both capacitor 90 and the D/A attenuation factor (the internal output resistance of D/A converter 14) which varies directly with the digital control signal from n-bit counter 16, therefore, the first-order lag is adjustable.

Figure 3:
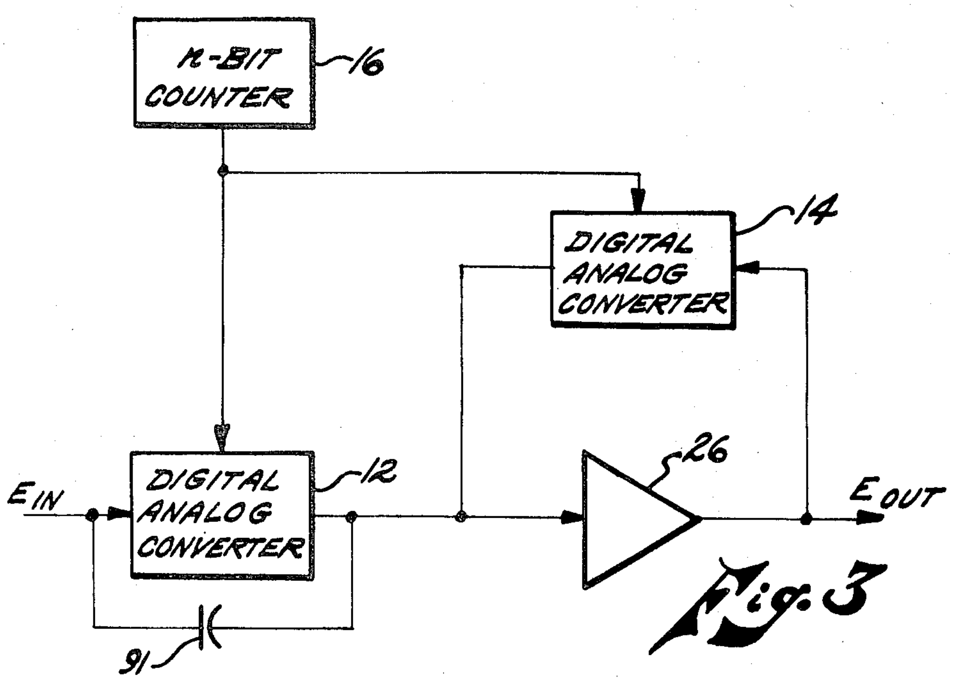
FIG. 3 is a block diagram, partly schematic, of an adaptive lead filter.

The circuit shown in FIG. 3 is an adaptive lead filter. The adaptive lead filter is a further modification of the adaptive lag filter of FIG. 2. The adaptive lead filter differs from the circuit in FIG. 2 in that the capacitor 90 which provides the lag function is removed and a capacitor 91 is placed in parallel with D/A converter 12. The capacitor 91 cooperates with the internal output resistance of D/A converter 12 to provide a first order lead function, which is adjustable.

Although the invention has been described with reference to a particular embodiment, it will be understood to those skilled in the art that the invention is capable of a variety of alternative embodiments within the spirit and scope of the appended claims.

We claim:

1. An adaptive filter apparatus comprising in combination:

operational amplifier having an input and an output;

feedback network connected between said output and said input of said operational amplifier;

first and second digitally controlled variable resistance means, each of said digitally controlled variable resistance means having first and second inputs and a single output, with each of said digitally controlled variable resistance means having an output resistance, said output resistances being controlled in a preselected manner by a signal received by said second input, said output of said first digitally controlled variable resistance means being connected to said input of said operational amplifier and said first input and said output of said second digitally controlled variable resistance means being connected across said feedback network; and an n-bit counter providing an output signal, said output signal being received by said second inputs of said first and second digitally controlled variable resistance means.

2. An adaptive filter apparatus as described in claim 1 wherein said digitally controlled variable resistance means comprises a digital to analog converter.

3. An adaptive filter apparatus as described in claim 1 wherein said feedback network comprises a bridge-T filter configuration to provide an adaptive bandpass filter.

4. An adaptive filter apparatus as described in claim 1 wherein said feedback network comprises a capacitor to provide an adaptive lag filter.

5. An adaptive filter apparatus comprising in combination:

operational amplifier having an input and an output;

first and second digitally controlled variable resistance means, each of said digitally controlled variable resistance means having first and second inputs and a single output, with each of said digitally controlled variable resistance means having an output resistance, said output resistances being controlled in a preselected manner by a signal received by said second input, said output of said first digitally controlled variable resistance means being connected to said input of said operational amplifier, said first input of said second digitally controlled variable resistance means being connected to said output of said operational amplifier and said output of said second digitally controlled variable resistance means being connected to said input of said operational amplifier;

a capacitor network connected in parallel across said first digitally controlled variable resistance means from said first input to said output; and an n-bit counter providing an output signal, said output signal being received by said second inputs of said first and second digitally controlled variable resistance means.

References Cited

UNITED STATES PATENTS

| | | | |
|---|---|---|---|
| 3,030,022 | 4/1962 | Gittleman | 330—145 X |
| 3,315,223 | 4/1967 | Hibbard et al. | 330—86 X |

ROY LAKE, Primary Examiner

L. J. DAHL, Assistant Examiner

U.S. Cl. X.R.

330—9, 109